(12) United States Patent
Janneck et al.

(10) Patent No.: US 8,042,084 B1
(45) Date of Patent: Oct. 18, 2011

(54) GENERATING FACTORIZATION PERMUTATIONS OF NATURAL NUMBERS AND PERFORMING CIRCUIT DESIGN EXPLORATION

(75) Inventors: Jorn W. Janneck, San Jose, CA (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 336 days.

(21) Appl. No.: 12/488,171

(22) Filed: Jun. 19, 2009

(51) Int. Cl.
*G06F 17/50* (2006.01)
(52) U.S. Cl. ........ 716/117; 716/100; 716/101; 716/110; 716/116; 341/173; 341/184; 341/185; 341/187; 707/602
(58) Field of Classification Search .......... 716/100–101, 716/103, 110, 116–117; 341/173, 184–185, 341/187; 707/602
See application file for complete search history.

(56) References Cited

U.S. PATENT DOCUMENTS

| | | | | |
|---|---|---|---|---|
| 7,640,528 | B1 * | 12/2009 | Baeckler | 716/100 |
| 7,797,667 | B1 * | 9/2010 | Baeckler | 716/117 |
| 2003/0186685 | A1 * | 10/2003 | Bollano et al. | 455/412 |

OTHER PUBLICATIONS

Kokosinski, On Generation of Permutations Through Decomposition of Symmetric Group Cosets, Institute of Electrical Enginering and Electronics, Poland, Apr. 1990.*

* cited by examiner

*Primary Examiner* — Nghia Doan
(74) *Attorney, Agent, or Firm* — Kevin T. Cuenot

(57) ABSTRACT

A method of determining a factorization permutation for a natural number can include storing a canonical prime factor vector within memory of a system and storing a first basis vector within the memory. The method can include deriving a first count sequence, including a plurality of counts, from the first basis vector, wherein each count of the first count sequence is a child of the first basis vector. For each count of the first count sequence, a second basis vector can be output that is a child of the count, wherein each count of the first count sequence and child second basis vector specifies a factorization permutation of the natural number.

20 Claims, 7 Drawing Sheets

200

| L | A | B | C |
|---|---|---|---|
| 40 | {2, 20}<br>{4, 10}<br>{8, 5}<br>{5, 8}<br>{10, 4}<br>{20, 2} | {2, 2, 10}<br>{2, 4, 5}<br>{2, 5, 4}<br>{2, 10, 2}<br>{4, 2, 5}<br>{4, 5, 2}<br>{5, 2, 4}<br>{5, 4, 2}<br>{10, 2, 2} | {2, 2, 2, 5}<br>{2, 2, 5, 2}<br>{2, 5, 2, 2}<br>{5, 2, 2, 2} |

| Natural Number | L = 12 |
|---|---|
| Prime Factorization | F = {2, 2, 3} |
| Canonical Prime Factor Vector | C = {2, 3} |
| Basis Vector | B = {2, 1} |
| Count Sequence | S = {00, 01, 02, 10, 11, 12} |

FIG. 3

GENERATING FACTORIZATION PERMUTATIONS OF NATURAL NUMBERS AND PERFORMING CIRCUIT DESIGN EXPLORATION

FIELD OF THE INVENTION

The embodiments disclosed within this specification relate to determining factorization permutations of natural numbers and to performing circuit design exploration using factorization permutations.

BACKGROUND

When designing a system, it is worthwhile to consider different circuit designs and the merits of each respective circuit design prior to selecting one circuit design as the foundation of the system. Often, each circuit design represents a particular or unique circuit architecture. As an example, consider the case of a multi-rate, multi-stage filter. Such filters are commonly used within wire-line and wireless communications, audio, and other applications. When designing a multi-rate, multi-stage filter for a selected application, a variety of different circuit architectures are likely available. Each circuit architecture can have, for example, a different number of stages. Each stage can apply a different amount of sampling rate reduction. It is often difficult to accurately recognize each circuit architecture that can be used for a given application. It can be even more difficult to adequately assess the merits of each circuit architecture that is available.

SUMMARY

The embodiments disclosed within this specification relate to determining factorization permutations of natural numbers and to performing circuit design exploration using factorization permutations. One embodiment of the present invention can include a method, performed by a system including a processor and a memory, of determining one or more factorization permutations for a natural number. The method can include storing a canonical prime factor vector within the memory, wherein the canonical prime factor vector includes unique prime factors of a prime factorization of the natural number, and storing a first basis vector within the memory. The first basis vector can correspond to the canonical prime factor vector and specify a number of instances of each unique prime factor within the prime factorization. The method can include deriving a first count sequence, including a plurality of counts, from the first basis vector, wherein each count of the first count sequence is a child of the first basis vector. For each count of the first count sequence, a second basis vector that is a child of the count can be output. Each count of the first count sequence and child second basis vector specifies a factorization permutation of the natural number.

In one aspect, each factorization permutation that is not a null factorization permutation can be unique and can include a same number of factors.

In another aspect, the method can include determining at least one attribute of a circuit design defined by one of the factorization permutations and outputting the circuit design. In yet another aspect, the method can include determining an attribute of a circuit design defined by each factorization permutation, selecting at least one factorization permutation according to the attribute of the circuit design defined by the factorization permutation, and outputting the at least one factorization permutation.

For each count of the first count sequence, outputting the second basis vector can include determining a carry free difference between the first basis vector and the count.

The method further can include, for each second basis vector, generating a second count sequence including a plurality of counts and, for each count of each second count sequence, outputting a third basis vector as a child of the count of the second count sequence. The third basis vector and each count that is an ancestor of the third basis vector specifies an additional factorization permutation.

Outputting the third basis vector can include, for each count of each second count sequence, determining a carry free difference between the second basis vector that is a parent of the count of the second count sequence and the count of the second count sequence.

Each additional factorization permutation that is not a null factorization permutation can be unique and can include at least one additional factor than the factorization permutations specified by the second basis vector and the counts of the first count sequence.

Another embodiment of the present invention can include a system that determines a factorization permutation for a natural number. The system can include a memory storing program code and a processor coupled to the memory that executes the program code. Accordingly, upon executing the program code, the processor can store a canonical prime factor vector within the memory, wherein the canonical prime factor vector includes unique prime factors of a prime factorization of the natural number, and store a first basis vector within the memory. The first basis vector corresponds to the canonical prime factor vector and specifies a number of instances of each unique prime factor within the prime factorization. The processor can derive a first count sequence, including a plurality of counts, from the first basis vector. Each count of the first count sequence is a child of the first basis vector. For each count of the first count sequence, the processor can output a second basis vector that is a child of the count, wherein each count of the first count sequence and child second basis vector specifies a factorization permutation of the natural number.

In one aspect, the processor can determine at least one attribute of a circuit design defined by one of the factorization permutations and output the circuit design. In another aspect, the processor can determine an attribute of a circuit design defined by each factorization permutation, select at least one factorization permutation according to the attribute of the circuit design defined by the factorization permutation, and output the at least one factorization permutation.

Each factorization permutation determined by the processor that is not a null factorization permutation can be unique and can include a same number of factors.

For each count of the first count sequence, the processor can output the second basis vector by determining a carry free difference between the first basis vector and the count.

Further, the processor can, for each second basis vector, generate a second count sequence including a plurality of counts and, for each count of each second count sequence, output a third basis vector as a child of the count of the second count sequence. The third basis vector and each count that is an ancestor of the third basis vector can specify an additional factorization permutation.

Another embodiment of the present invention can include a device including a data storage medium usable by a system having a processor and a memory. The data storage medium stores program code that, when executed by the system, causes the system to store a canonical prime factor vector within the memory, wherein the canonical prime factor vector includes unique prime factors of a prime factorization of the natural number, and store a first basis vector within the memory. The first basis vector corresponds to the canonical prime factor vector and specifies a number of instances of each unique prime factor within the prime factorization. The data storage medium can cause the system to derive a first count sequence, including a plurality of counts, from the first basis vector, wherein each count of the first count sequence is a child of the first basis vector. The data storage medium further can cause the system to, for each count of the first count sequence, output a second basis vector that is a child of the count. Each count of the first count sequence and child second basis vector specifies a factorization permutation of the natural number.

In one aspect, the program code stored in the data storage medium can cause the system to determine at least one attribute of a circuit design defined by one of the factorization permutations and output the circuit design. In another aspect, the program code stored in the data storage medium can cause the system to determine an attribute of a circuit design defined by each factorization permutation, select at least one factorization permutation according to the attribute of the circuit design defined by the factorization permutation, and output the at least one factorization permutation.

Each factorization permutation that is not a null factorization permutation can be unique and can include a same number of factors.

The program code stored in the data storage medium can cause the system to, for each count of the first count sequence, output a second basis vector that is a child of the count, by determining a carry free difference between the first basis vector and the count.

The program code stored in the data storage medium also can cause the system to, for each second basis vector, generate a second count sequence including a plurality of counts and, for each count of each second count sequence, output a third basis vector as a child of the count of the second count sequence. The third basis vector and each count that is an ancestor of the third basis vector specifies an additional factorization permutation.

BRIEF DESCRIPTION OF THE DRAWINGS

FIG. 2 is a table illustrating factorization permutations for a selected natural number generated by the system of FIG. 1 in accordance with another embodiment of the present invention.

FIG. 3 is a table illustrating values used by the system of FIG. 1 in accordance with another embodiment of the present invention.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the embodiments of the invention.

The embodiments disclosed within this specification relate to determining factorization permutations of natural numbers and to generating and/or assessing circuit designs defined by the factorization permutations. In accordance with the inventive arrangements disclosed herein, a plurality of factorizations for a given natural number can be determined. In generating the factorizations, different permutations of each factorization, referred to as "factorization permutations," can be generated and output.

The factorization permutations that are generated can be used to perform circuit design exploration. One or more circuit designs can be identified as being defined by each factorization permutation that is determined. Further, each circuit design, whether generated or not, can be assessed according to one or more criteria thereby allowing a circuit designer to better select one of the circuit designs or factorization permutations as the foundation of a system.

Figure 1:
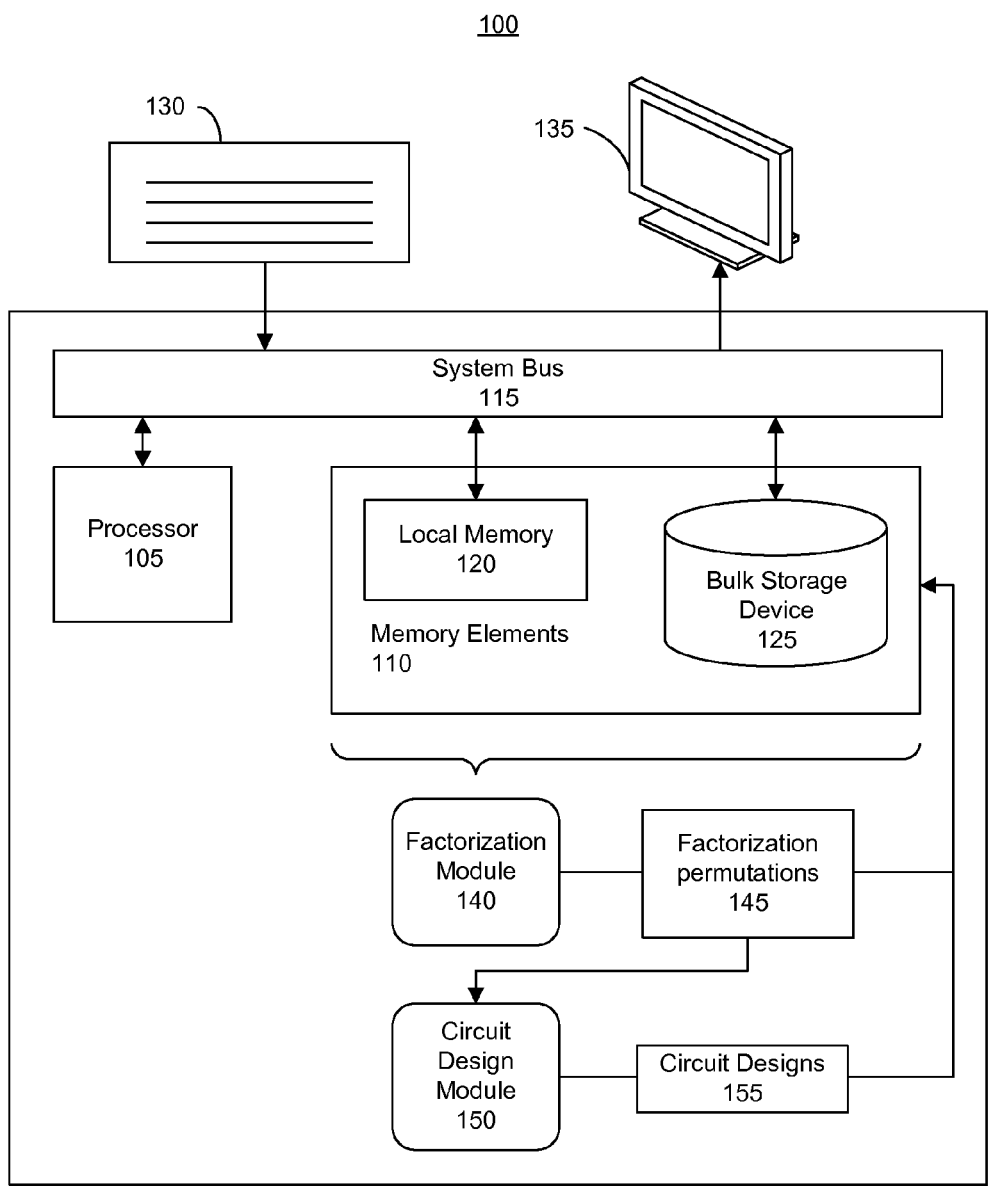
FIG. 1 is a first block diagram illustrating a system for generating factorization permutations and performing circuit design exploration in accordance with one embodiment of the present invention.

FIG. 1 is a first block diagram illustrating a system 100 for generating factorization permutations and performing circuit design exploration in accordance with one embodiment of the present invention. In one aspect, system 100 can generate one or more circuit designs for instantiation within, or implementation as, an integrated circuit (IC). The circuit designs that are generated can be instantiated within an IC, whether the IC is a programmable IC or not.

Programmable ICs are a well-known type of integrated circuit that can be programmed to perform specified logic functions. Examples of programmable ICs can include, but are not limited to, field programmable gate arrays (FPGAs), complex programmable logic devices (CPLDs), and mask programmable devices. The phrase "programmable IC" refers to the ICs noted herein and ICs that are only partially programmable. For example, another type of programmable IC includes a combination of hard-coded transistor logic and a programmable switch fabric that programmably interconnects the hard-coded transistor logic.

System 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as computer that is suitable for storing and/or executing computer-usable program code. It should be appreciated, however, that system 100 can be implemented in the form of any system comprising a processor and memory that is capable of performing the functions described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device (not shown) optionally can be coupled to system 100. The I/O devices can be coupled to system 100 either directly or through intervening I/O controllers. Network adapters also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with system 100.

As pictured in FIG. 1, memory elements 110 can store a factorization module 140 and a circuit design module 150. Factorization module 140 and circuit design module 150, being implemented in the form of executable program code, can be executed by system 100. Factorization module 140 can determine one or more factorization permutations for a given natural number. Each factorization permutation can include prime factors, non-prime factors, or both prime and non-prime factors depending upon the number of factors desired within each respective factorization permutation. Thus, for a given natural number, for example, a user can select the number of factors desired in the factorization permutations that are to be generated. Factorization module 140 can determine and output one or more factorization permutations 145 for a given natural number that comprise the desired number of factors.

Each of the factorization permutations 145 can be output to memory elements 110, and thus, be provided to circuit design module 150. As used herein, "outputting" and/or "output" can mean storing in memory elements 110, for example, writing to a file stored in memory elements 110, writing to display 135 or other peripheral output device, playing audible notifications, sending or transmitting to another system, exporting, or the like.

Circuit design module 150 can receive factorization permutations 145. In one embodiment, circuit design module 150 can generate and output a plurality of different circuit designs 155. Each different circuit design can be dependent upon, or be generated according to, one of the factorization permutations 145 received from factorization module 140. For example, each factorization permutation 145 can define the architecture of one of the circuit designs 155.

Using a multi-rate, multi-stage filter as an example, each factorization permutation 145 can specify a particular architecture for a circuit design implementing the multi-rate, multi-stage filter. In such an embodiment, the number of factors of each factorization permutation corresponds to the number of stages of the filter. The value of each factor corresponds to the sampling rate change applied in each respective stage of the filter. Multi-rate, multi-stage filters are but one example of the different types of circuits to which factorization permutations can be applied. Other examples can include a multi-stage amplifier or any other circuit design in which a plurality of different multi-stage options are available for implementing the circuit design.

Each of the generated circuit designs 155 can be evaluated according to one or more different criteria. For example, each of circuit designs 155 can be evaluated for the amount of hardware resources needed to construct the circuit design. Referring to the multi-rate, multi-stage filter example, the number of multipliers, memories, and other circuit resources can be counted to provide a measure indicating resource usage by each one of circuit designs 155.

In another embodiment, rather than automatically generating a circuit design corresponding to each of factorization permutations 145, circuit design module 150 can, for each of factorization permutations 145, estimate an amount of circuit resources needed to implement a circuit architecture defined by that factorization permutation. The cost in terms of circuit resources can be used as a means of ranking each factorization permutation or the circuit designs specified by the factorization permutations.

Circuit design module 150 can be configured to select the circuit design, or factorization permutation as the case may be, that utilizes the least amount of circuit resources. If other techniques for assessing the different circuit designs or estimating the performance of circuit designs defined by factorization permutations are available, the circuit designs and/or factorization permutations can be evaluated using such techniques independently or in any combination. For example, in addition to attributes relating to circuit resource usage, one or more attributes of a circuit design relating to timing and/or power consumption can be used.

Circuit design module 150, working in cooperation with factorization module 140, can automatically explore different solutions as described. Circuit design module 150 can automatically generate circuit designs 155 or assess factorization permutations 145 in terms of the circuit designs defined by each respective factorization permutation 145. Circuit design module 150 can select one or more particular circuit designs automatically or output evaluation results thereby allowing a circuit designer to make a manual selection of a particular factorization permutation, and thus, circuit design having an architecture defined by the selected factorization permutation.

FIG. 2 is a table 200 illustrating factorization permutations for a selected natural number that can be generated by the factorization module of FIG. 1 in accordance with another embodiment of the present invention. In the example shown in FIG. 2, the number 40 under column heading "L" has been selected as the natural number for which factorization permutations are desired. Each of columns A, B, and C of table 200 specifies a plurality of different factorization permutations. Each of columns A, B, and C further has a fixed number of factors within each factorization permutation.

For example, column A includes six factorization permutations, with each factorization permutation comprised of two factors. Column A specifies each possible factorization permutation of two factors for the natural number 40. Each factorization permutation within column A is unique with respect to each other factorization permutation within column A.

Column B illustrates each of the nine possible factorization permutations comprised of three factors for the natural number 40. Each factorization permutation of column B is unique with respect to each other factorization permutation within column B. Finally, column C illustrates each of the four possible factorization permutations comprised of four factors for natural number 40. Each of the factorization permutations of column C is unique with respect to each other factorization permutation of column C.

Table 200 is an example of an output generated by the factorization module described with reference to FIG. 1. In this example, a user has asked for each possible factorization permutation of the natural number 40 comprising two, three, and four factors. Accordingly, table 200, or the different factorization permutations specified within table 200, can be output and/or provided to the circuit design module also described with reference to FIG. 1 for evaluation and circuit design exploration.

FIG. 3 is a table 300 illustrating values used by the system of FIG. 1 in accordance with another embodiment of the present invention. Table 300 shows that for a given natural number, denoted as L, a plurality of different vectors are generated. In the example shown in FIG. 3, L=12. The prime factorization, denoted as F, of a natural number can be defined as the set of prime factors of L, e.g., $F\{f_0, f_1, \ldots, f_{p-1}\}$. As known, $L=f_0 \cdot f_1 \cdot \ldots \cdot f_{p-1}$. In the example pictured in FIG. 3, where L=12, F is {2, 2, 3}. As can be seen, the prime factor "2" appears in F two times and, as such, is a second order factor. It can also be said that F includes two instances of the prime factor "2." As the prime factor "3" appears in F only one time, the prime factor "3" is a first order factor.

In one embodiment of the present invention, the factorization module can determine the prime factorization of a given natural number. As is known in the art, a variety of different methods and/or techniques exist that may be used or applied to determine the prime factors of a given natural number. In another embodiment, a different program and/or module can be used to determine the prime factors of the selected natural number. In that case, the prime factorization can be output or otherwise provided to the factorization module.

Examples of different techniques that can be used to determine the prime factorization of a given natural number can include Dixon's algorithm, Continued Fraction Factorization (CFRAC), Quadratic Sieve, General Number Field Sieve, Shanks' Square Forms Factorization (SQUFOF), and the like. These examples utilize a congruence of squares approach. Still, any of a variety of different techniques can be used to determine prime factorizations. Accordingly, the embodiments disclosed herein are not intended to be limited to one particular technique.

The prime factorization can be represented in terms of a canonical prime factor vector, denoted as C, and a corresponding basis vector, denoted as B. The canonical prime factor vector represents the set of unique prime factors of L. Continuing with the example where L=12, the prime factor of "2" appears in F two times. The prime factor "2" appears in C, however, only one time. As shown in FIG. 3, C is {2, 3}. C includes only a single instance of each prime factor of L. The corresponding basis vector B specifies the number of instances of each prime factor of C that exist in F. Continuing with the example, B is {2, 1}. B indicates that there are two instances of the prime factor "2" in F and that there is one instance of the prime factor "3" in F. When considering the canonical prime factor vector and the basis vector, the ordering of values within each respective vector is significant as the first digit (the left-most digit) within the basis vector indicates the number of instances of the first prime factor (the left-most prime factor) of C within F. The second digit (in this example the right-most digit) of the basis vector indicates the number of instances of the second prime factor (in this example the right-most digit) of C within F. It should be appreciated that as the number of elements of C increases, so too does the number of elements of B. The number of elements of C equals the number of elements of B. A one-to-one correspondence, or mapping, exists between the elements of C and the elements of B.

The count sequence, denoted as S, is expressed as $S=s_0, s_1, s_2, \ldots, s_{i-1}$. The count sequence is derived from the basis vector of a selected natural number. Continuing with the prior example, the count sequence where L=12 is shown. The count sequence is determined by starting from zero and counting up until the count sequence reaches B, where B is rewritten with the least significant digit to the right. Accordingly, the count sequence begins with 00 and continues to 12, which is B rewritten with the least significant digit to the right.

In accordance with one embodiment, the count sequence can be expressed using numbers from different base numbering systems. More particularly, whereas a number, such as 135, is expressed exclusively using a single base numbering system where each of the digits 1, 3, and 5 each is expressed in base 10, this need not be the case with respect to each digit or element of a count of a count sequence. The value of each digit, or element, of the basis vector determines the base number system of the corresponding digit or element of the count.

For example, an element, or digit, of "2" in the basis vector indicates that the corresponding digit or element of the count within the count sequence is expressed in base three in that the value expressed can be 0, 1, or 2. In another example, an element or digit of "1" in the basis vector indicates that the corresponding digit or element of the count within the count sequence is expressed in base 2 in that the value expressed can be 0 or 1. In view of the basis vector {2 1}, the count begins at 00 and counts up to 12, which is the basis vector rewritten with the least significant digit or element to the right. Accordingly, after the count of 01, the next count is 02. The count after 02 is 10. The count after 11 does not reset to 00, but rather is 12 as the right-most digit is expressed in base 3, whereas the left-most digit is expressed in base 2.

Figure 4:
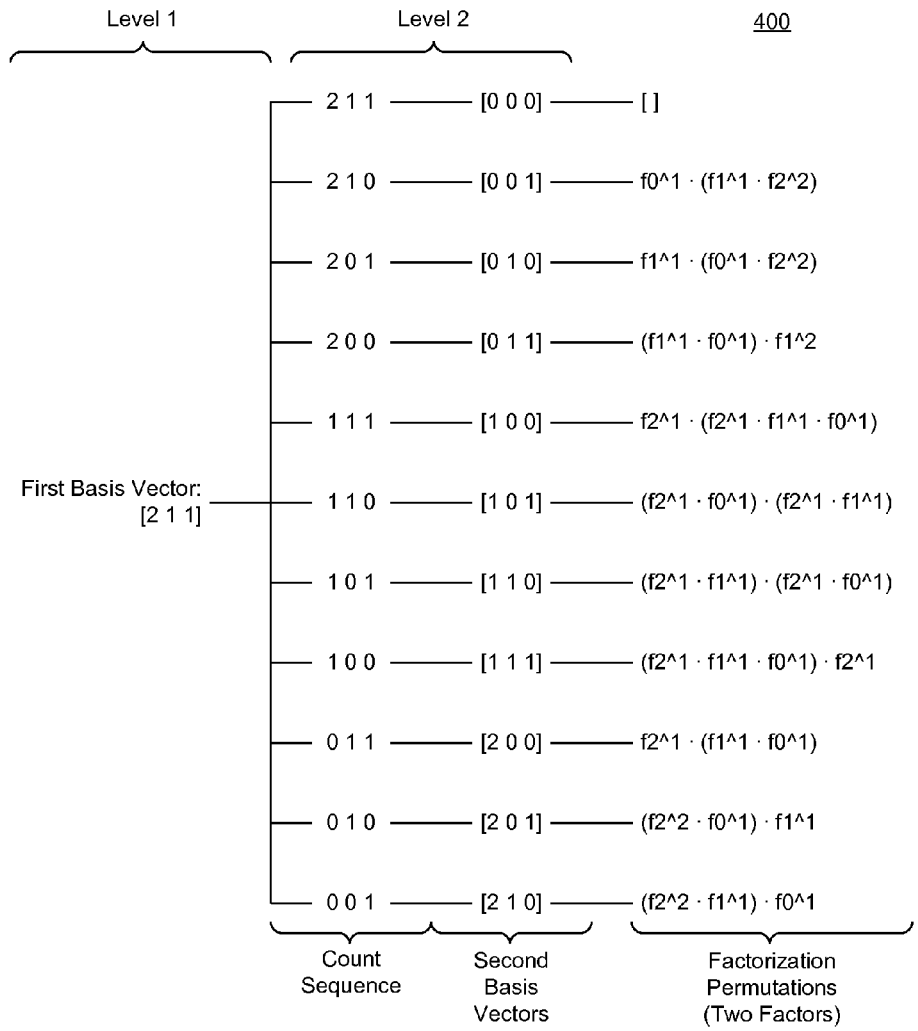
FIG. 4 is a first factorization tree generated by the system of FIG. 1 in accordance with another embodiment of the present invention.

FIG. 4 is a first factorization tree 400 generated by the system of FIG. 1 in accordance with another embodiment of the present invention. Factorization tree 400 illustrates a technique for determining each factorization permutation having a desired number of factors. In this example, factorization tree is composed of a first level and a second level. Each level is delineated, or identifiable, by virtue of a column including basis vectors. The number of levels of each factorization tree indicates the number of factors that are included in each factorization permutation at each leaf of the factorization tree. As such, factorization tree 400, being a two level tree, specifies each possible factorization permutation of two factors for a given natural number.

It should be appreciated that each factorization tree not only corresponds to a particular natural number, but also a particular basis vector. As shown, factorization tree 400 corresponds to the basis vector of B{1,1,2}. When constructing a factorization tree, for purposes of determining the count sequences, the basis vector is rewritten with the least significant digit to the right and shown in brackets as [2 1 1]. Thus, any reference to a basis vector within a factorization tree or a basis vector written using bracket notation is presumed to be expressed with the least significant digit to the right. Each count of a count sequence is not enclosed by any brackets or parenthesis.

In any case, one property of a factorization tree, is that the factorization tree, if generated to the proper number of levels, specifies all factorization permutations for any natural number that can be represented using the same basis vector, e.g.,

[2 1 1]. Thus, factorization tree 400 specifies each factorization permutation of two factors for any natural number having a basis vector of [2 1 1].

The basis vector [2 1 1] is denoted as the first basis vector since the process described with reference to FIG. 4 is recursive in nature. The count sequence corresponding to basis vector [2 1 1] is determined to be 001, 110, 011, 100, 101, 110, 111, 200, 201, 210, 211. In this example, the first count of 000 has been omitted from S as any time that a count of a count sequence or a basis vector is comprised of all zeros, the factorization permutation corresponding to that branch of the factorization tree will be a null factorization permutation. A null factorization permutation indicates that there is no corresponding factorization for the selected natural number that includes the enumerated number of factors, in this case two.

Accordingly, within FIG. 4, the counts of the count sequence are listed in the column labeled "Count Sequence" in decreasing order from 211 to 001. As discussed, the left-most digit of each count is expressed in base 3 as the left-most digit of the basis vector is "2." The middle and right-most digits of each count are expressed in base 2 since the middle and right-most digits of the basis vector both are "1."

The column labeled as "Second Basis Vectors" is derived from the first basis vector and each respective count of the count sequence. Each one of the second basis vectors is determined according to $B_{i+1} = B \div s_j$, where $s_j \in S$. Within this notation, the symbol "$\div$" represents a generalized division operator describing the carry-free difference between corresponding digits, or elements, in the two operands B and $s_j$.

Referring to the first, or top, branch of FIG. 4 including the count 211, the second basis vector of [0 0 0] is determined by taking the carry free difference between the first basis vector [2 1 1] and the count 211. Taking the carry free difference between corresponding digits yields a new basis vector of [0 0 0]. This specifies a null factorization. As noted, the occurrence of a basis vector of [0 0 0] or a count of 000 indicates that there is no corresponding factorization permutation with two factors. For ease of explanation, the second basis vector [0 0 0] can be said to be a child of count 211. Count 211 can be said to be a parent of second basis vector [0 0 0]. First basis vector [2 1 1] can be said to be an ancestor of each of count 211 and second basis vector [0 0 0].

Referring to the second branch with the count 210, the carry free difference between the first basis vector [2 1 1] and count 210 results in a new, e.g., a second, basis vector of [0 0 1]. Referring to the third branch with count 201, the carry free difference between the first basis vector [2 1 1] and count 201 results in a second basis vector of [0 1 0]. This process can be continued until a new, in this case second, basis vector is determined for each branch, e.g., each count, within factorization tree 400.

Factorization tree 400 represents a two level tree in that there are effectively two columns corresponding to basis vectors. The first column corresponds to the first basis vector. The third column corresponds to the set of second basis vectors that are determined from calculating the carry free difference between the first basis vector and each count of the count sequence.

The last column, e.g., the right-most column, labeled "Factorization Permutations (Two Factors)" specifies the exact factorization permutation specified by each respective leaf in factorization tree 400. Each factorization permutation is specified by a combination of the second basis vector and the corresponding count of the branch. More particularly, each factorization permutation is specified by a combination of the second basis vector and the parent count of the second basis vector.

To illustrate the notation used to specify factorization permutations, consider that the canonical prime factor vector corresponding to basis vector [2 1 1] can be generally represented as $[f_2, f_1, f_0]$. As noted, the basis vector is rewritten with the least significant digit to the right. The canonical prime factor vector, however, is not rewritten. Within the figures, for ease of illustration, no subscripts are used. Accordingly, $f_2$ is represented as f2, $f_1$ is represented as f1, $f_0$ and is represented as f0. Also, within the figures, no superscripts are used to represent exponents. Rather, each exponent is illustrated as "^y." Each factorization permutation that includes more than two terms includes parenthesis to indicate the set of terms that are combined into a single term through multiplication so that each factorization permutation includes exactly two factors or is a null factorization permutation.

Figure 5:
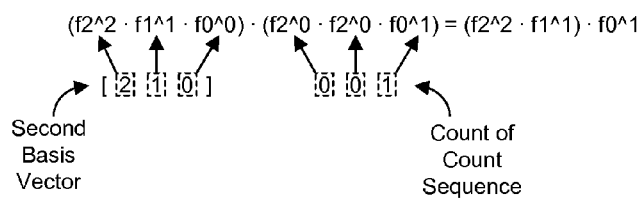
FIG. 5 is a representation of a branch of the factorization tree described with reference to FIG. 4.

FIG. 5 is a representation of a branch of the factorization tree of FIG. 4. More particularly, FIG. 5 illustrates how the second basis vectors and parent counts specify factorization permutations. FIG. 5 illustrates the eleventh branch, e.g., the last or bottom branch, of the factorization tree of FIG. 4 having count 001 and second basis vector [2 1 0]. For clarity, the branch has been rewritten with the second basis vector first, followed by the parent count.

Each digit of the second basis vector maps to one of the factors of the canonical prime factor vector $[f_2, f_0, f_0]$. The "2" digit of the second basis vector [2 1 0] maps to $f_2$. The "1" digit of the second basis vector [2 1 0] maps to $f_1$. The "0" digit of the second basis vector [2 1 0] maps to $f_0$. Each digit of the second basis vector specifies the exponent of the factor of the canonical prime factor vector to which the digit maps. As such, the second basis vector specifies a factor of the factorization permutation corresponding to $(f_2^2 \cdot f_1^1 \cdot f_0^0)$. Since any number taken to the power of zero is one, this factor of the factorization permutation can be reduced to $(f_2^2 \cdot f_1^1)$. Thus, the first factor of the factorization permutation is determined by squaring the $f_2$ term and multiplying that result by the $f_1$ term to the power of one.

Each digit of count 001 maps to one of the factors of the canonical prime factor vector $[f_2, f_1, f_0]$. The first "0" digit from left to right of count 001 maps to $f_2$. The second "0" digit of count 001 maps to $f_1$. The "1" digit of count 001 maps to $f_0$. As was the case with respect to the second basis vector, each digit of the count specifies the exponent of the factor of the canonical prime factor vector to which the digit maps. As such, the second basis vector specifies a factor of the factorization permutation corresponding to $(f_2^0 \cdot f_1^0 \cdot f_0^1)$. Since any number taken to the power of zero is one, this factor of the factorization permutation can be reduced to $f_0^1$. Thus, the second factor of the factorization permutation is simply $f_0$.

Applying this methodology to each leaf of the factorization tree of FIG. 4 results in the particular factorization permutation shown. Each factorization permutation is unique. As noted, any time a second basis vector or a count is formed of all zeros, e.g., the first (top) branch of factorization tree 400, the resulting factorization permutation will have less than the desired number of factors, as at least one factor will be one. As such, the factorization permutation for that branch is denoted as [ ] to represent a null factorization permutation.

Figure 6A:
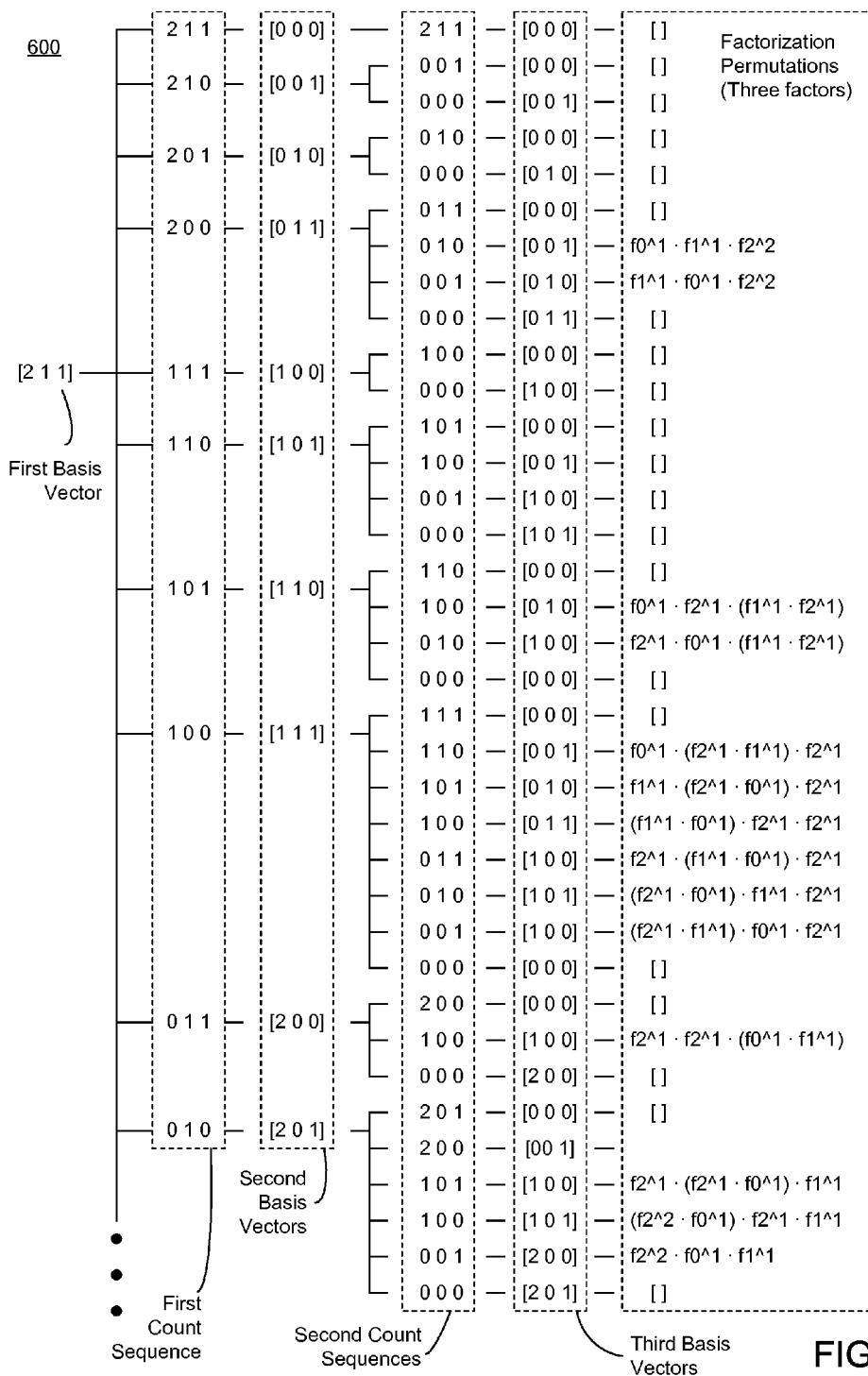
FIGS. 6A and 6B, taken together, form a second factorization tree generated by the system of FIG. 1 in accordance with another embodiment of the present invention.
Figure 6B:
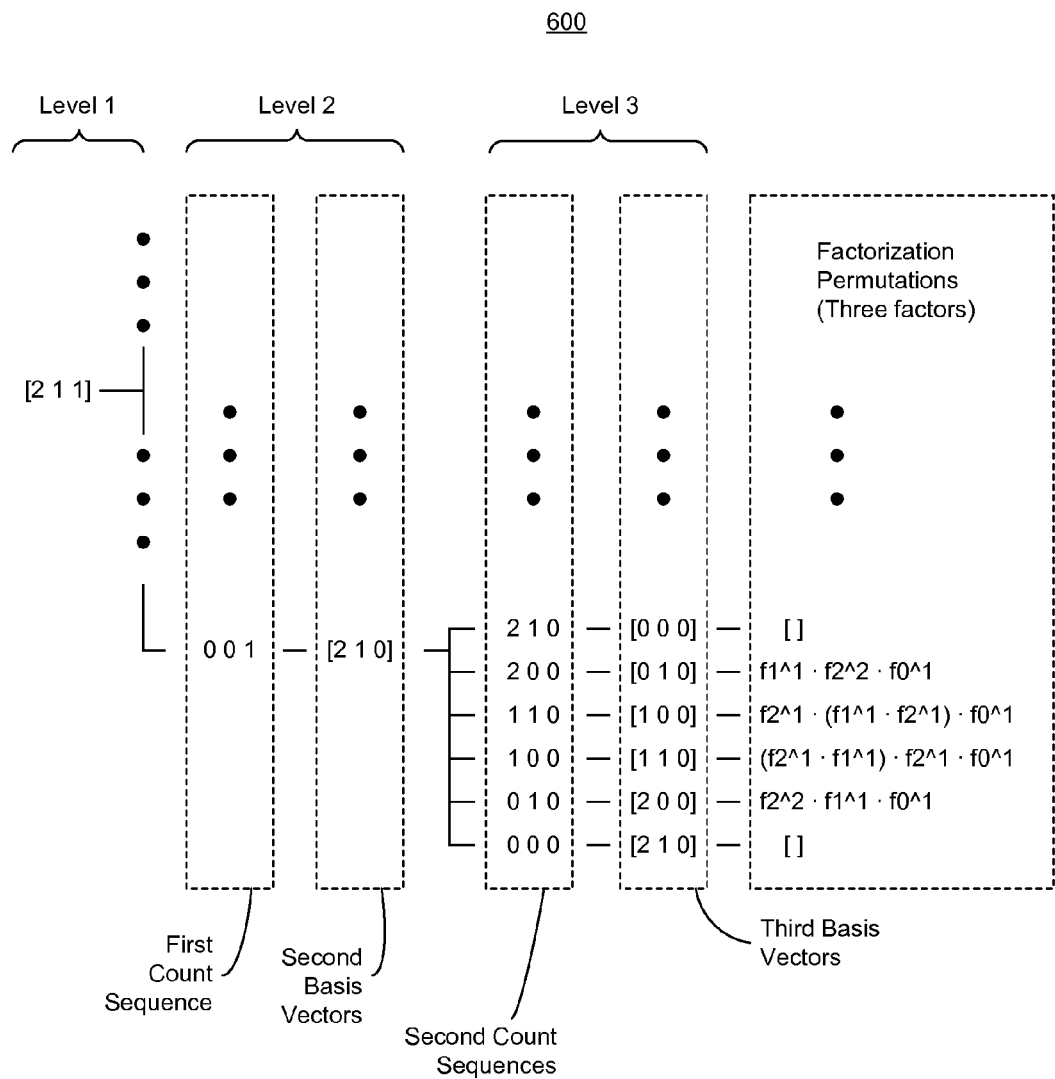

FIGS. 6A and 6B, taken together, form a second factorization tree 600 generated by the system of FIG. 1 in accordance with another embodiment of the present invention. Factorization tree 600 is a three level factorization tree also for the basis vector [2 1 1]. As such, factorization tree 600 specifies factorization permutations that include three factors. Factorization tree 600 is built from factorization tree 400 of FIG. 4 by recursively creating count sequences and determining new basis vectors.

The third level of factorization tree 600, as labeled in FIG. 6B, is generated by determining a second count sequence for each second basis vector. For example, a second count sequence of 000, 001 is generated from the second basis vector [0 0 1]. As shown, the second basis vector [0 0 1] is the child of count 210 of the first count sequence. From the second basis vector [0 0 1] and the count sequence 000, 001, third basis vectors of [0 0 0] and [0 0 1] are derived. Each third basis vector is derived by taking the carry free difference between the second basis vector and each child count. Each child count is a member of the second count sequence generated from the parent second basis vector. Thus, taking the carry free difference between the second basis vector [0 0 1] and child count 001 results in the third basis vector [0 0 0]. Taking the carry free difference between the second basis vector [0 0 1] and child count 000 results in the third basis vector [0 0 1].

For each leaf of factorization tree 600, the factorization permutation is specified by a combination of the third basis vector and each ancestor count. More particularly, the factorization permutations are specified by a combination of the third basis vector, the parent count of the third basis vector (which is an ancestor), and the ancestor count of the second basis vector, which is a count of the first count sequence.

In illustration, consider the factorization permutation $f_0^1 \cdot f_1^1 \cdot f_2^2$, which corresponds to the leaf of the branch defined by count 200 of the first count sequence, child second basis vector [0 1 1], child count 010 of the second count sequences, and child third basis vector [0 0 1]. The three factors of the factorization permutation are determined as follows. The third basis vector [0 0 1] specifies the first factor, in this case $f_0^1$, where each digit of the third basis vector maps digit by digit to the canonical prime factor vector as described with reference to FIG. 5. It should be appreciated that the first term is $f_2^0 \cdot f_1^0 \cdot f_0^1$, which simplifies to $f_0^1$.

The parent count 010 of the third basis vector within the second count sequences specifies the second factor of the factorization permutation, in this case $f_1^1$. Each digit of the parent count 010 maps digit by digit to the canonical prime factor vector as described with reference to FIG. 5. It should be appreciated that the second term is $f_2^0 \cdot f_1^1 \cdot f_0^0$, which simplifies to $f_1^1$.

Finally, the ancestor count 200, which is a count within the first count sequence specifies the third factor of the factorization permutation, in this case $f_2^2$. Each digit of the ancestor count 200 maps digit by digit to the canonical prime factor vector as described with reference to FIG. 5. It should be appreciated that the third term is $f_2^2 \cdot f_1^0 \cdot f_0^0$, which simplifies to $f_2^2$.

Factorization tree 600 can be expanded to determine factorization permutations with additional factors by continuing to recursively add count sequences and determine new basis vectors. For example, to generate a fourth level, a count sequence can be generated for each third basis vector. Fourth basis vectors can be determined as described. The first factor of each factorization permutation comprising four factors is determined by the most recent, e.g., the right-most, basis vector which is one of the fourth basis vectors in this example. The second factor of each factorization permutation would be specified by the parent count of the fourth basis vector. The third factor is specified by the next ancestor count up the branch of the factorization tree. The fourth factor is specified by the last ancestor count, e.g., the count of the first count sequence of the factorization tree. Thus, any factorization permutation is specified by a combination of the most recently generated basis vector and each ancestor count up the branch of the factorization tree until the first basis vector is encountered.

Figure 7A:
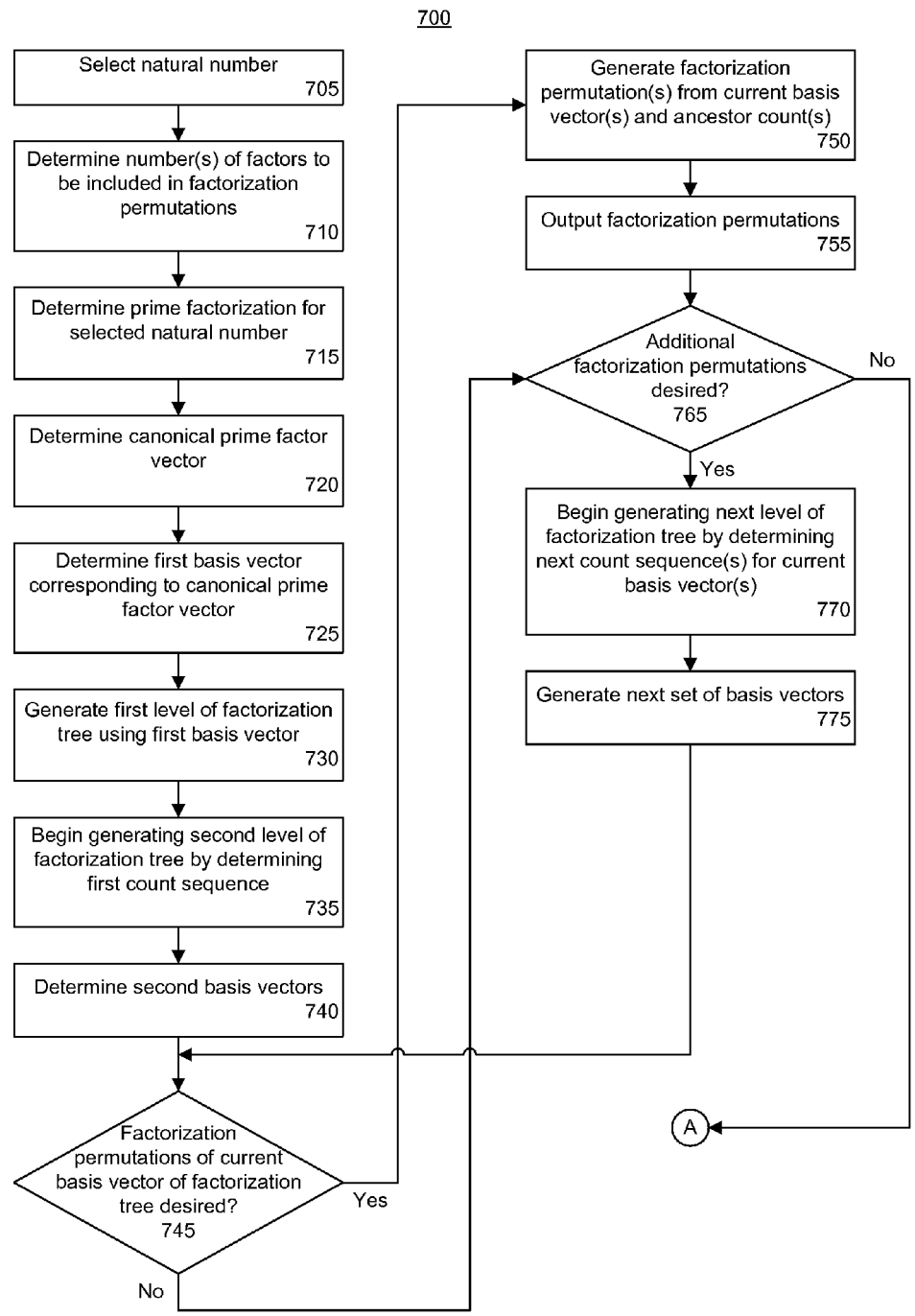
FIGS. 7A and 7B, taken together, form a flow chart illustrating a method of determining factorization permutations and performing circuit design exploration using the factorization permutations in accordance with another embodiment of the present invention.
Figure 7B:
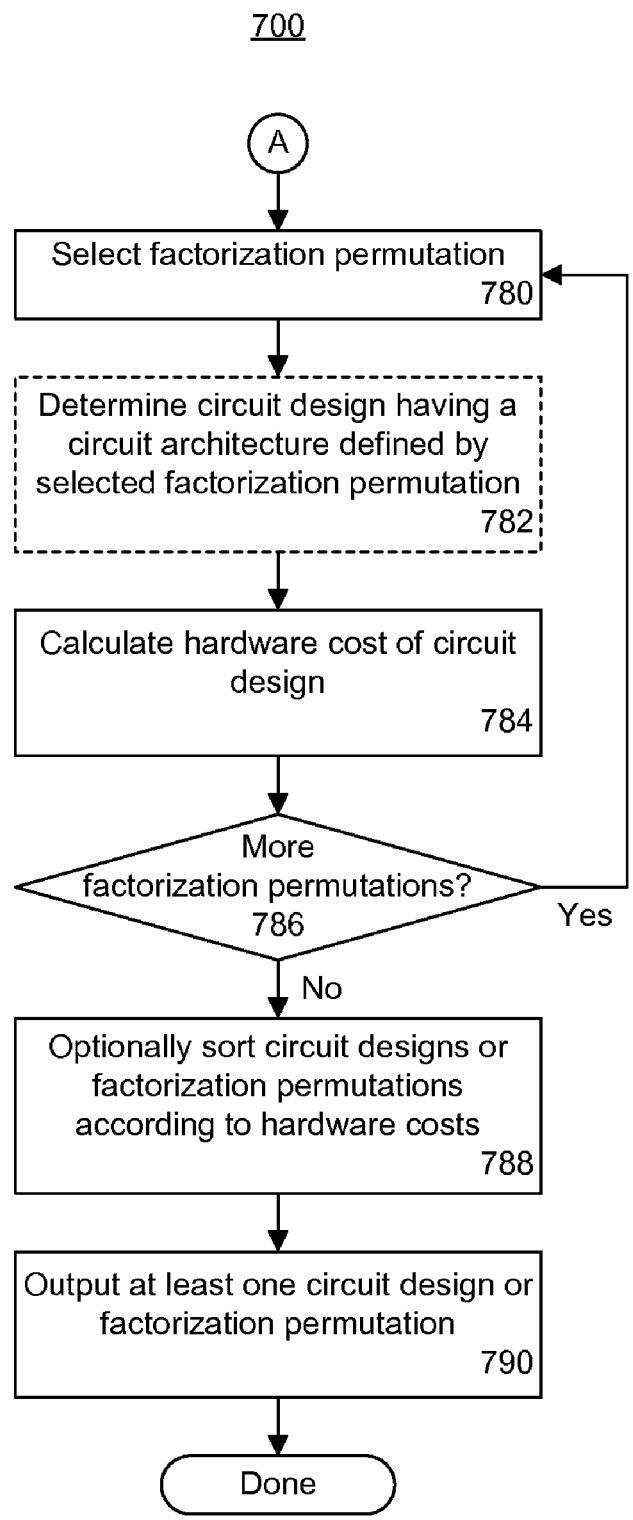

FIGS. 7A and 7B, taken collectively, form a flow chart illustrating a method 700 of determining factorization permutations and performing circuit design exploration using the factorization permutations in accordance with another embodiment of the present invention. Method 700 can be performed by a system as described with reference to FIGS. 1-6.

Method 700 can begin in step 705, where a natural number can be selected. In one embodiment, the system can receive a user input specifying a natural number. In illustration, a circuit designer can be tasked with building a filter that receives data encoded at a 96 MHz sampling rate and that is to reduce the sampling rate to 1 MHz. Rather than building a design that reduces the sampling rate by a factor of 96 in a single stage, a multi-stage, multi-rate design is often more appropriate. A multi-stage, multi-rate design typically provides improved performance over single stage designs. In this example, the circuit designer can provide the natural number "96" as input to the system.

In step 710, the number of factors desired in the factorization permutations generated by the system can be determined. In one embodiment, the system can receive a user input specifying a desired number of factors. In another embodiment, the system can receive a user input specifying more than one number of factors. Referring to the multi-stage, multi-rate filter example, the number of factors in a given factorization permutation coincides with the number of levels in the factorization tree that is generated as well as the number of stages in the circuit design that will be implemented according to the factorization permutation. Thus, a factorization permutation with two factors is specified by a two-level factorization tree and specifies a two stage filter design. A factorization with three factors specifies a three stage filter design.

It should be appreciated that while the number of stages, e.g., factors, can be provided by a user as an input to the system, in other embodiments, the system can be configured to explore factorization permutations comprising a plurality of different numbers of factors or all factorization permutations. For example, the system can be configured to explore, e.g., generate factorization permutations comprising two or more factors up to some specified number "N" of factors, where N is an integer that is greater than or equal to two. The value of N can be coded into the system or can be a user specified value that is received as input to the system.

In step 715, a prime factorization for the selected natural number can be determined. The prime factorization can be determined by the system or can be determined by another program executing within a processor-based system that provides the prime factorization to the system. As noted, a variety of well-known techniques exist for determining prime factorizations, any of which can be used to determine the prime factorization for the selected natural number. It should be appreciated that within method 700, when an element is determined, generated, output, or the like, that the system, in performing that step, also stores the element within memory.

In step 720, the system can determine the canonical prime factor vector for the selected natural number, and thus, store the canonical prime factor in memory. As described, the canonical prime factor vector is formed of the set of unique prime factors for the selected natural number arranged from smallest to largest. In step 725, the first basis vector corresponding to the canonical prime factor vector for the selected natural number can be determined, and thus, stored within memory. The first basis vector specifies the number of instances of each of the unique prime factors of the canonical prime factor vector that exist within the prime factorization of the selected natural number.

In step 730, the first level of a factorization tree can be generated using the first basis vector. As noted, the first basis vector is written in the factorization tree with the least significant digit to the right. In step 735, the system can begin generating the second level of the factorization tree. The system determines the first count sequence derived from the first basis vector. The first count sequence is determined by starting at a value of zero and counting up until the basis vector, as rewritten within the factorization tree, is reached. Each digit, or element, of the count in the count sequence is specified in a base number system determined from the corresponding digit, or element, in the basis vector. For purposes of discussion, the most recently generated set of count sequence(s), e.g., those within a same column of the factorization tree, are considered to be the "current" count sequence or sequences. As illustrated in FIGS. 4 and 6, the counts of the first count sequence are listed in descending order.

In step 740, the system can complete the second level of the factorization tree by determining the second basis vectors. For ease of illustration, the most recently generated basis vectors are considered the "current" basis vectors. In this iteration, the second basis vectors are the current basis vectors. Each of the second basis vectors is determined by calculating the carry free difference between the first basis vector and each respective count of the first count sequence, e.g., each child count of the first basis vector.

In step 745, the system determines whether factorization permutation(s) corresponding to the current basis vectors of the factorization tree are desired. The level number of the factorization tree indicates the number of factors that are included in each factorization permutation. Thus, each factorization permutation generated from a leaf at the second level of the factorization tree, being defined by the column of second basis vectors, has two factors. If factorization permutations from the current basis vectors are desired, method 700 can continue to step 750. If not, method 700 can proceed to step 765.

In step 750, the system can generate factorization permutations from each current basis vector and ancestor count of each respective current basis vector. In this iteration, the current basis vectors still are the second basis vectors. The counts used are the counts of the first count sequence. As discussed with reference FIG. 5, the second basis vectors specify the first factor of each factorization permutation and the parent count of each second basis vector specifies the second factor of each factorization permutation. As discussed with reference to FIG. 6, as the factorization tree expands beyond two levels, each factorization permutation is specified by the most recent basis vector and each count that is an ancestor of the most recent basis vector. In step 755, the factorization permutation(s) are output.

In step 765, the system determines whether additional factorization permutations are desired. More particularly, the system determines whether factorization permutations comprising additional factors are to be determined. If so, method 700 proceeds to step 770 to generate additional factorization permutations. If not, method 700 continues to step 780 to begin circuit design exploration.

Continuing with step 770, the system can begin generating the next level of the factorization permutation tree by determining a next set of count sequences corresponding to the current set of basis vectors. More particularly, for each current basis vector, a count sequence is generated. In step 775, the next set of basis vectors is generated as the current set of basis vectors. New basis vectors, e.g., third basis vectors, are generated by taking a plurality of carry free differences. For each second basis vector, the carry free difference between the second basis vector and each child count of the second basis vector is determined. The result of each carry free difference collectively becomes the set of current basis vectors. After step 775, method 700 loops back to step 745 to continue processing.

Continuing with step 780, one of the factorization permutations generated by the system is selected. In step 785, the system optionally determines a circuit design having a circuit architecture defined by the selected factorization permutation. Referring again to the multi-stage, multi-rate filter example, consider the case where the factorization permutation is 8, 6, 2, corresponding to the natural number 96. The factorization permutation specifies a multi-stage, multi-rate filter having three stages. One stage is specified by each factor of the factorization permutation. The value of each factor indicates the amount of sample rate reduction applied in that stage. Thus, the first stage reduces the sample rate by a factor of 8. The second stage reduces the sampling rate by a factor of 6. The third and final stage reduces the sampling rate by a factor of 2. The number of stages in combination with the value corresponding to each stage specifies the architecture of the circuit design.

In step 784, the system can calculate the hardware cost of a circuit design specified by the selected factorization permutation. In one embodiment, the system can determine the hardware cost of the circuit determined in step 782. In another embodiment, the system need not generate an actual circuit design, but rather estimate the amount of circuit resources that would be required to implement such a circuit having the architecture specified by the selected factorization permutation. The amount of circuit resources needed varies according to the number of stages of the circuit design and the value of each stage. The system can estimate the number of circuit resources needed in terms of multipliers, digital signal processing units, memories, etc. that are needed. The raw data specifying the circuit resources needed can be translated into a measure of hardware cost, e.g., a score, that can be used to compare the circuit design, and thus factorization permutation, to other circuit designs defined by other factorization permutations. As noted, other techniques for evaluating circuit designs and/or factorization permutations can be used such as timing, power consumption, or any combination of the various circuit attributes discussed within this specification.

In step 786, the system can determine whether additional factorization permutations remain to be processed. If so, method 700 can loop back to step 780 to select a next factorization permutation for processing. If not, method 700 can continue to step 788. In step 788, the system can optionally sort the circuit designs generated from factorization permutations, or factorization permutations as the case may be, according to the hardware cost, or other attributes, of each respective circuit design or estimated cost of implementing each factorization permutation.

In step 790, the top "N" circuit designs or factorization permutations in terms of having the lowest cost can be output. In this case, N can be an integer having a value that is greater than or equal to one. For example, the circuit design or factorization permutation associated with the lowest hardware cost can be output. Accordingly, the system can output the circuit design having an architecture that most efficiently, in terms of lowest resource usage, accomplishes the objective of the circuit designer.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

Embodiments of the present invention can be realized in hardware or a combination of hardware and software. The embodiments can be realized in a centralized fashion in one system or in a distributed fashion where different elements are spread across several interconnected systems. Any kind of data processing system or other apparatus adapted for carrying out the methods described herein is suited.

Embodiments of the present invention further can be embedded in a device such as a computer program product, which comprises all the features enabling the implementation of the methods described herein. The device can include a data storage medium, e.g., a computer-usable or computer-readable medium, storing program code that, when loaded and executed in a system comprising memory and a processor, causes the system to perform the functions described herein. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. Within a system comprising a processor and a memory, a method of determining a factorization permutation for a natural number, the method comprising:
    storing a canonical prime factor vector within the memory, wherein the canonical prime factor vector comprises unique prime factors of a prime factorization of the natural number;
    storing a first basis vector within the memory, wherein the first basis vector corresponds to the canonical prime factor vector and specifies a number of instances of each unique prime factor within the prime factorization;
    deriving a first count sequence, comprising a plurality of counts, from the first basis vector, wherein each count of the first count sequence is a child of the first basis vector;
    for each count of the first count sequence, outputting a second basis vector that is a child of the count, wherein each count of the first count sequence and child second basis vector specifies a factorization permutation of the natural number;
    determining, using the processor, an attribute of a circuit design defined by the factorization permutations;
    selecting at least one factorization permutation according to the attribute of the circuit design defined by the factorization permutations; and
    outputting the at least one factorization permutation.

2. The method of claim 1, wherein determining an attribute of a circuit design defined by the factorization permutations further comprises
    determining at least one attribute of a circuit design defined by one of the factorization permutations.

3. The method of claim 1, wherein determining an attribute of a circuit design defined by the factorization permutations further comprises
    determining an attribute of a circuit design defined by each factorization permutation.

4. The method of claim 1, wherein each factorization permutation that is not a null factorization permutation is unique and comprises a same number of factors.

5. The method of claim 1, wherein for each count of the first count sequence, outputting the second basis vector comprises determining a carry free difference between the first basis vector and the count.

6. The method of claim 5, further comprising:
    for each second basis vector, generating a second count sequence comprising a plurality of counts; and
    for each count of each second count sequence, outputting a third basis vector as a child of the count of the second count sequence, wherein the third basis vector and each count that is an ancestor of the third basis vector specifies an additional factorization permutation.

7. The method of claim 6, wherein outputting the third basis vector comprises, for each count of each second count sequence, determining a carry free difference between the second basis vector that is a parent of the count of the second count sequence and the count of the second count sequence.

8. The method of claim 6, wherein each additional factorization permutation that is not a null factorization permutation is unique and comprises at least one additional factor than the factorization permutations specified by the second basis vector and the counts of the first count sequence.

9. A system that determines a factorization permutation for a natural number, the system comprising:

a memory storing program code; and a processor coupled to the memory and executing the program code, wherein the processor:

stores a canonical prime factor vector within the memory, wherein the canonical prime factor vector comprises unique prime factors of a prime factorization of the natural number;

stores a first basis vector within the memory, wherein the first basis vector corresponds to the canonical prime factor vector and specifies a number of instances of each unique prime factor within the prime factorization;

derives a first count sequence, comprising a plurality of counts, from the first basis vector, wherein each count of the first count sequence is a child of the first basis vector;

for each count of the first count sequence, outputs a second basis vector that is a child of the count, wherein each count of the first count sequence and child second basis vector specifies a factorization permutation of the natural number;

determines an attribute of a circuit design defined by the factorization permutations;

selects at least one factorization permutation according to the attribute of the circuit design defined by the factorization permutations; and outputs the at least one factorization permutation.

10. The system of claim 9, wherein the processor determines an attribute of a circuit design defined by the factorization permutations by determining at least one attribute of a circuit design defined by one of the factorization permutations.

11. The system of claim 9, wherein the processor determines an attribute of a circuit design defined by the factorization permutations by determining an attribute of a circuit design defined by each factorization permutation.

12. The system of claim 9, wherein each factorization permutation determined by the processor that is not a null factorization permutation is unique and comprises a same number of factors.

13. The system of claim 9, wherein the processor, for each count of the first count sequence, outputs the second basis vector by determining a carry free difference between the first basis vector and the count.

14. The system of claim 13, wherein the processor:

for each second basis vector, generates a second count sequence comprising a plurality of counts; and for each count of each second count sequence, outputs a third basis vector as a child of the count of the second count sequence, wherein the third basis vector and each count that is an ancestor of the third basis vector specifies an additional factorization permutation.

15. A device comprising:

a non-transitory data storage medium usable by a system comprising a processor and a memory, wherein the non-transitory data storage medium stores program code that, when executed by the system, causes the system to:

store a canonical prime factor vector within the memory, wherein the canonical prime factor vector comprises unique prime factors of a prime factorization of the natural number;

store a first basis vector within the memory, wherein the first basis vector corresponds to the canonical prime factor vector and specifies a number of instances of each unique prime factor within the prime factorization;

derive a first count sequence, comprising a plurality of counts, from the first basis vector, wherein each count of the first count sequence is a child of the first basis vector;

for each count of the first count sequence, output a second basis vector that is a child of the count, wherein each count of the first count sequence and child second basis vector specifies a factorization permutation of the natural number;

determine an attribute of a circuit design defined by the factorization permutations;

select at least one factorization permutation according to the attribute of the circuit design defined by the factorization permutations; and output the at least one factorization permutation.

16. The device of claim 15, wherein the program code stored in the non-transitory data storage medium further causes the system to:

determine at least one attribute of a circuit design defined by one of the factorization permutations.

17. The device of claim 15, wherein the program code stored in the non-transitory data storage medium further causes the system to:

determine an attribute of a circuit design defined by each factorization permutation.

18. The device of claim 15, wherein each factorization permutation that is not a null factorization permutation is unique and comprises a same number of factors.

19. The device of claim 15, wherein the program code stored in the non-transitory data storage medium further causes the system to, for each count of the first count sequence, output a second basis vector that is a child of the count, by determining a carry free difference between the first basis vector and the count.

20. The device of claim 19, wherein the program code stored in the non-transitory data storage medium further causes the system to:

for each second basis vector, generate a second count sequence comprising a plurality of counts; and for each count of each second count sequence, output a third basis vector as a child of the count of the second count sequence, wherein the third basis vector and each count that is an ancestor of the third basis vector specifies an additional factorization permutation.

* * * * *